US012596359B2

(12) United States Patent (10) Patent No.: US 12,596,359 B2
Daube et al. (45) Date of Patent: Apr. 7, 2026

(54) SYSTEM, METHOD AND COMPUTER PROGRAM FOR CONTROLLING A PRODUCTION PLANT CONSISTING OF A PLURALITY OF PLANT PARTS, IN PARTICULAR A METALLURGICAL PRODUCTION PLANT FOR PRODUCING INDUSTRIAL GOODS SUCH AS METAL SEMI-FINISHED PRODUCTS AND/OR METAL END PRODUCTS

(71) Applicant: SMS group GmbH, Düsseldorf (DE)

(72) Inventors: Thomas Daube, Duisburg (DE); Holger Behrens, Erkrath (DE); Lutz Kümmel, Jüchen (DE); Ulrich Sommers, Düsseldorf (DE)

(73) Assignee: SMS group GmbH, Düsseldorf (DE)

( * ) Notice: Subject to any disclaimer, the term of this patent is extended or adjusted under 35 U.S.C. 154(b) by 587 days.

(21) Appl. No.: 18/009,061

(22) PCT Filed: May 20, 2021

(86) PCT No.: PCT/EP2021/063555
§ 371 (c)(1),
(2) Date: Dec. 8, 2022

(87) PCT Pub. No.: WO2021/249740
PCT Pub. Date: Dec. 16, 2021

(65) Prior Publication Data
US 2023/0251639 A1     Aug. 10, 2023

(30) Foreign Application Priority Data
Jun. 10, 2020    (DE) ..................... 10 2020 207 247.7

(51) Int. Cl.
*G05B 19/418*          (2006.01)

(52) U.S. Cl.
CPC .................. *G05B 19/41875* (2013.01); *G05B 2219/32368* (2013.01)

(58) Field of Classification Search
CPC .... G05B 19/41875; G05B 2219/32368; G05B 2219/32015; G05B 2219/32177; G05B 2219/36039; Y02P 90/02
See application file for complete search history.

(56) References Cited

U.S. PATENT DOCUMENTS 6,790,034 B1 *  9/2004  Kearns ...................... F27B 7/42
                                              432/106
10,365,640 B2   7/2019  Baseman et al.
                        (Continued)

FOREIGN PATENT DOCUMENTS

DE       102018216495 A1    8/2019
EP           3358431 A1     8/2018
            (Continued)

OTHER PUBLICATIONS

Wilfried Runde et al., Hightech-Produktionsplanung mit X-Pact MES 4.0 bei Big River Steel, stahl und eisen 138 (2018) Nr. 9.

*Primary Examiner* — Yuhui R Pan
(74) *Attorney, Agent, or Firm* — Smartpat PLC

(57) ABSTRACT

A metallurgical production plant has a plurality of plant parts. An input quality window defines required quality characteristics of the input product to each plant part. An output quality window defines permissible quality characteristics of the output product of each plant part. The output quality window of an upstream plant part corresponds to the input quality window of the downstream plant part. A process window defines the setting values that can be implemented by the respective plant part. Each plant part detects the current state by sensors and adapts the process window to the detected current state. A system for controlling the production plant determines setting values for the (Continued)

respective plant automation unit of each plant part. The setting values are selected within the process windows such that the product produced in the production plant meets the quality characteristics required by the input quality windows and output quality windows.

16 Claims, 2 Drawing Sheets

(56) References Cited

U.S. PATENT DOCUMENTS

| | | | |
|---|---|---|---|
| 2004/0093107 A1* | 5/2004 | Good | H01L 22/20 |
| | | | 257/E21.525 |
| 2019/0265686 A1 | 8/2019 | Obata et al. | |
| 2019/0361409 A1 | 11/2019 | Bettinger et al. | |
| 2020/0004230 A1* | 1/2020 | Ankermann | G07C 3/146 |

FOREIGN PATENT DOCUMENTS

| | | | |
|---|---|---|---|
| EP | 3106948 | B1 | 9/2020 |
| JP | S5980721 | B | 1/1991 |
| JP | 2010126771 | B | 12/2012 |
| WO | 2011107268 | | 11/2011 |
| WO | 2018050438 | A3 | 5/2018 |
| WO | 2018145947 | A1 | 8/2018 |

* cited by examiner

SYSTEM, METHOD AND COMPUTER PROGRAM FOR CONTROLLING A PRODUCTION PLANT CONSISTING OF A PLURALITY OF PLANT PARTS, IN PARTICULAR A METALLURGICAL PRODUCTION PLANT FOR PRODUCING INDUSTRIAL GOODS SUCH AS METAL SEMI-FINISHED PRODUCTS AND/OR METAL END PRODUCTS

TECHNICAL FIELD

The disclosure relates to a system and method for controlling a production plant consisting of a plurality of plant parts, in particular a metallurgical production plant for producing industrial goods such as metal semi-finished products and/or metal end products. The disclosure further relates to a method for controlling a production plant consisting of a plurality of plant parts, in particular a metallurgical production plant for producing industrial goods such as metal semi-finished products and/or metal end products, and to a computer program for executing the method in accordance with the disclosure, in particular by means of a system in accordance with the disclosure.

BACKGROUND

In the production of metal semi-finished products and/or metal end products, a multi-stage process chain of a metallurgical production plant is passed through. For example, components for automobiles pass through the following typical process chain after the production of pig iron or the use of scrap in a steel mill: Continuous casting of slabs, hot rolling to 1 to 6 mm, pickling of the strip to remove scale residues, cold rolling to 0.3 to 3 mm, heat treatment in the annealing furnace to set the characteristic microstructure, heating of the strip to a coating temperature of 340 to 480° C., hot-dip coating, cutting to size, forming, joining and color coating. Among other things, the following plant parts of the metallurgical production plant are used: Continuous casting, hot strip mill, pickling/tandem mill, strip galvanizing line, stamping/pressing line, automatic welding machine and dip coating line.

During the production of long products by a metallurgical production plant, for example, the following process chain is passed through: Continuous casting of billets, hot rolling on 4 to 200 mm round stock in several rolling stands, removal of the scaled surface and forging. This process chain is represented, for example, by the following plant parts of the metallurgical production plant: Continuous casting of billets, wire/billet mill, peeling line and forging press.

From an abstract point of view, each product passes through a plurality of transformation stages (plant parts) until the end product is reached. Thereby, each transformation stage has an input quality window, an output quality window and a process window. The input quality window defines the required quality characteristics of the input product. Through the output quality window, criteria are defined after each transformation stage (plant part) to check the quality of the intermediate product. In a production plant consisting of a plurality of plant parts, the output quality window of an upstream transformation stage (plant part) is to be equal to the input quality window of the downstream transformation stage (plant part). Each transformation stage (plant part) also has a process window that defines the setting values that can be transformed by the respective transformation stage (plant part) for the plant automation unit of the transformation stage (plant part). The setting values are adjusted such that the quality defined in the output quality window of the transformation stage (plant part) is achieved by the transformation stage (plant part).

A product changes its state from A to B through a transformation stage or a plant part, as the case may be. For example, in a pickling line the scaled surface is removed after hot rolling, in an annealing furnace the material properties are adjusted by targeted heating and cooling, or in a wire rolling mill a wire of, for example, 5.5 mm round is produced from a billet (for example 150×150 mm²). These are only a few examples of transformation stages or plant parts, as the case may be, of a metallurgical production plant.

After each transformation stage (plant part), criteria that the product should possess after transformation are defined. Such criteria have lower and upper limits within which the characteristics of the product must lie. All criteria that must be met after a transformation stage (plant part) form the quality window. In a production plant consisting of a plurality of transformation stages (plant parts), the output quality window of an upstream transformation stage (plant part) corresponds to the input quality window of the downstream transformation stage (plant part). In particular, the requirements (input quality windows) of a subsequent transformation stage (plant part) define the quality requirements (output quality windows) for the upstream transformation stage (plant part). Examples of quality windows are that there is no residual scale on the product after pickling, that the yield strength and tensile strength are within specified limits, or that a round material does not exceed specified ovality (difference between minimum and maximum diameter). These are just a few examples of quality windows of transformation stages or plant parts, as the case may be, of a metallurgical production plant.

In order to achieve the output quality window after a transformation stage (plant part), the setting values for the plant automation unit of the transformation stage (plant part) can be adapted within the process window of the transformation stage (plant part). Examples of process windows of transformation stages (plant parts) are the temperature of the acid of a pickling line to clean scaled surfaces, the holding time in the annealing furnace to adapt the yield strength or the slides between rolling stands to influence ovality. These are only a few examples of process windows of transformation stages or plant parts, as the case may be, of a metallurgical production plant.

In the individual transformation stages (plant parts), the sequence of products to be produced is taken over by a production planning system. For example, in a pickling line, products with similar scaling are passed through the pickling solution one after the other to minimize necessary temperature changes of the acid in the pickling tanks. Accordingly, in an annealing furnace, products with similar annealing temperatures can be produced one after the other, or in a wire rolling mill, the sequence of products is determined in such a manner that the set-up time for roll changes is minimal. These are just a few examples of production planning in transformation stages (plant parts) of metallurgical plants.

Production planning is only carried out for one transformation stage (plant part), wherein the production sequence is optimized for this transformation stage (plant part). Moreover, when planning the production sequence, an ideal state of the transformation stage (plant part) and/or an ideal input product is usually assumed.

SUMMARY

The disclosure is based on the object of optimizing the production process in a production plant consisting of a plurality of plant parts, in particular a metallurgical production plant for the production of industrial goods such as metal semi-finished products and/or metal end products.

The object is achieved by a system for controlling a production plant consisting of a plurality of plant parts, in particular a production plant for producing industrial goods such as metal semi-finished products and/or metal end products, wherein each plant part has an input quality window, an output quality window and a process window, wherein the input quality window of a plant part defines the quality characteristics of the input product that are required by the plant part, and the output quality window of a plant part defines the quality characteristics of the output product that are allowed by the plant part after processing of the input product, wherein, in a production plant consisting of a plurality of plant parts, the output quality window of an upstream plant part corresponds to the input quality window of the downstream plant part, wherein the process window defines the setting values that can be implemented by the respective plant part for a plant automation unit of the plant part, wherein each plant part detects the current state by means of sensors and adapts the process window of the plant part to the detected current state, and wherein the system for controlling the production plant consisting of the plurality of plant parts determines setting values for the respective plant automation unit for each plant part, the setting values being within the respective process windows and that the product produced in the production plant meets the quality characteristics required by the input quality windows and output quality windows of the plurality of plant parts.

A plant part within the meaning of the disclosure may also be generally referred to as a transformation stage.

The states of the plant parts of the production plant are monitored by means of sensors. On the basis of such monitoring, the process windows of the respective plant parts can be adapted to the current state of the plant part. For example, it thereby takes into account that the process window reduces over time due to wear that occurs. Malfunctions or external influences can also be detected and the process window of the affected plant part can be adapted accordingly.

The system determines setting values for the plant automation units of the plant parts of the production plant, wherein the setting values are within the current process windows of the plant parts. Thus, the current plant state is taken into account when determining the setting values. The setting values are selected such that the product produced in the production plant meets the quality characteristics required by the input quality windows and output quality windows of the plurality of plant parts. It is therefore ensured that the produced product meets the necessary quality requirements throughout the entire production process. This simultaneously ensures that the final product meets the quality requirements.

According to an advantageous variant, after the product to be produced has been processed by a plant part, the system updates the setting values for the plant automation units of the subsequent plant parts on the basis of the achieved output quality of the processed plant part and the current process windows of the subsequent plant parts. Thus, after the product to be produced has been processed by one plant part, the subsequent processing by the subsequent plant parts is updated. The processing already performed by the previous plant parts is unchangeable and the processing by the subsequent plant parts is determined on the basis of the current process windows of the subsequent plant parts.

In accordance with a variant, the system determines a sequence of products to be produced in the production plant, in particular taking into account the current process windows and the achievable quality characteristics of the output products of the plant parts. The production of products in the production plant is optimized on the basis of the current state of the plant parts and the current process windows for a plurality of products to be produced. For example, products with comparable or similar quality requirements are thereby produced one after the other, such that the setting values for the plant automation unit of the plant parts differ as minimally as possible. In particular, the system takes into account the differences and/or similarities of the products to be produced when determining the sequence of products to be produced in the production plant.

In a variant, the system takes into account the possible setting value change rates that can be implemented by the respective plant automation units when determining the setting values for the plant automation units of the respective plant parts. Although the plant automation units of the individual plant parts can implement the setting values within the current process window, this is often only possible within specified periods of time. Therefore, no setting value jumps can be implemented, but only changes within a given setting value change rate can be implemented. Such setting value change rates are taken into account by the system when determining the setting values for the plant automation units of the respective plant parts.

According to a preferred variant, the system comprises a quality control after one or more plant parts, for checking the achieved product qualities, in particular for adapting the setting values for the plant automation units of the subsequent plant parts. In other words, there is a check of whether, at the location of quality control, the product produced up to that point has the expected quality characteristics. If the determined quality deviates from the expected quality, the setting values for the plant automation units of the subsequent plant parts may be adapted, such that the product subsequently also meets the quality requirements of the input quality windows and output quality windows of the subsequent plant parts.

In accordance with an expedient variant, the setting values of the plant automation unit of a plant part determine the output quality of the product produced in the plant part, in particular whether and in which range of the output quality window the quality of the product produced in the plant part lies. The quality of the output product of a plant part is thus determined via the setting values, wherein the setting values must lie within the current process window of the plant part.

In a variant, the sensors of the plant parts detect the wear, maintenance state or the like of the plant part.

According to a particularly preferred embodiment, the system creates a prediction model for the future states of the plant parts and takes into account the states of the plant parts predicted by the prediction model and the resulting process windows of the plant parts when determining the setting values for the plant automation units of the plant parts. By means of the prediction model, the future state of plant parts at the point in time of processing a specified product is predicted in particular. If, for example, the production plant consists of 5 different plant parts, the currently detected plant state is taken into account for the first plant part and the future state of the corresponding plant part is predicted for each of the following plant parts by means of the prediction model. On the basis of such states, the process windows of the plant parts are adapted and the corresponding setting values are subsequently determined within such process windows. The prediction model improves the accuracy of production plant control, in particular as the number of plant parts increases. The prediction model is particularly advantageous when determining a production sequence for the production plant, since the prediction model can also be used to determine the corresponding states of the plant parts and the resulting process windows for products to be produced in the future, and these can be taken into account when planning the production sequence.

In accordance with a variant, the prediction model is based on the states of the plant parts detected by means of the sensors, the achieved product qualities by the plant parts, other measured values associated with the production plant or the like. In particular, the temporal course of the specified parameters can be monitored and a prediction of future states of the plant parts can be made on the basis of the historical data. The prediction can also be refined by maintenance information, information on products to be produced in the plant or other parameters affecting the production plant.

In an expedient variant, the prediction model is based on methods of statistical data analysis and/or machine learning, in particular linear or quadratic programs, genetic optimization, reinforcement learning with Q-tables, neural networks, simulated annealing, Metropolis, swarm algorithms, hill climbing, the Lagrange multiplier method or the like.

According to an advantageous variant, the prediction model is trained continuously or cyclically, in particular on the basis of the states of the plant parts detected by means of the sensors, the achieved product qualities of the plant parts, other measured values associated with the production plant or the like. The prediction model is thus continuously improved, such that the prediction accuracy increases steadily with the runtime of the production plant.

In accordance with a preferred variant, the system stops the production process in the production plant if the required quality of the produced product cannot be achieved. Alternatively, the system changes the production process to a different product to be produced, the required quality of which can still be achieved by the current production process. Thus, if it is determined that the desired product cannot be produced due to the current plant state, production is either stopped or changed to a different product that can still be produced. This can also take place during the production process, for example, after machining by one or more plant parts. If, for example, it becomes apparent after processing by a third plant part that the desired product can no longer be produced due to the current state of the following plant parts, the production process is already stopped after the third plant part. If possible, production is changed to a different product that can still be produced.

In an expedient variant, the change to a different product to be produced is limited to the pre-planned production of products to be produced within a specified period of time. Thus, the current production can only be changed to a product to be produced within the near future.

According to an advantageous variant, the system takes into account a plurality of plant parts of the same type, such that the processing of a production step can alternatively take place on different plant parts. Thus, if a plant part is unlikely to be able to achieve the required product quality, the production step can be carried out on another plant part of the same type that is likely to be able to provide the required product quality. This results, for example, from different current process windows of plant parts of the same type.

In accordance with an expedient variant, the system comprises a central data storage unit or provides a cloud storage unit for storing and providing system-relevant data, in particular the states of the plant parts detected by means of sensors, the achieved product qualities of the respective plant parts, the setting values for the plant automation units of the respective plant parts and the like.

In an advantageous variant, the plant parts comprise at least in part optical sensors for detecting geometric information of the products produced in the respective plant part. In particular with metallurgical production plants, the geometric information of the products produced in the respective plant part is an essential factor. For example, the system can derive from the geometric information the product quality of the product produced in the plant part and/or the plant state of the plant part, preferably by means of statistical methods and/or machine learning. Furthermore, the geometric information can be detected continuously by means of the optical sensors in a simple manner and subsequently evaluated, which improves the accuracy of the system.

According to an expedient variant, the system comprises a user interface for displaying information relevant to the production process, in particular on a portable device.

In accordance with a particularly preferred variant, the setting values for the plant automation units of the plurality of plant parts are determined by means of a model. In particular, the model thereby takes into account the input quality windows, the output quality windows and the current process windows of the plurality of plant parts. Furthermore, additional parameters can also be taken into account, such as detected measured values from the plant parts and/or from other data sources such as a production planning system, maintenance planning system or other components of the production plant. On the basis of the input data, the model can determine the optimum setting values for the respective plant parts for producing a product.

According to a variant, the model is based on laws of physics. In an alternative variant, the model is based on methods of statistical data analysis and/or machine learning, in particular linear or quadratic programs, genetic optimization, reinforcement learning with Q-tables, neural networks, simulated annealing, Metropolis, swarm algorithms, hill climbing, the Lagrange multiplier method or the like.

In accordance with an advantageous variant, the model is trained continuously or cyclically, i.e. constantly improved.

The object is further achieved by a method for controlling a production plant consisting of a plurality of plant parts, in particular a metallurgical production plant for producing industrial goods such as metal semi-finished products and/or metal end products, wherein each plant part has an input quality window, an output quality window and a process window, wherein the input quality window of a plant part defines the quality characteristics of the input product that are required by the plant part, and the output quality window of a plant part defines the quality characteristics of the output product that are allowed by the plant part after processing of the input product, wherein, in a production plant consisting of a plurality of plant parts, the output quality window of an upstream plant part corresponds to the input quality window of the downstream plant part, wherein the process window defines the setting values that can be implemented by the respective plant part for a plant automation unit of the plant part, wherein the method comprises the steps of:

detecting the current states in the plurality of plant parts, in particular by means of sensors, adapting the respective process windows of the plurality of plant parts based on the detected current states of the plurality of plant parts, and determining respective setting values for the plant automation units of the plurality of plant parts of the production plant, wherein the determined respective setting values are within the adapted respective process windows, and wherein the product produced in the production plant meets the quality characteristics required by the input quality windows and output quality windows of the plurality of plant parts.

In accordance with the method, the current states of the plant parts of the production plant are detected. This takes place in particular by means of suitable sensors. This allows the states to be detected in a simple manner and, in particular, continuously. On the basis of the detected current states of the plant parts, the process windows of the respective plant parts are adapted to the current state of the plant part. For example, it thereby takes into account that the process window reduces over time due to wear that occurs. Malfunctions or external influences can also be detected and the process window of the affected plant part can be adapted accordingly.

The method determines setting values for the plant automation units of the plant parts of the production plant, wherein the setting values are within the current process windows of the plant parts. Thus, the current plant state is taken into account when determining the setting values. The setting values are selected such that the product produced in the production plant meets the quality characteristics required by the input quality windows and output quality windows of the plurality of plant parts. It is therefore ensured that the produced product meets the necessary quality requirements throughout the entire production process. This simultaneously ensures that the final product meets the quality requirements.

In a variant, the method comprises the step of updating the setting values for the plant automation units of the subsequent plant parts after the product to be produced has been processed by a plant part. The updating takes place on the basis of the achieved output quality of the processed plant part and the current process windows of the subsequent plant parts. Thus, after the product to be produced has been processed by one plant part, the subsequent processing by the subsequent plant parts is updated. The processing already performed by the previous plant parts is unchangeable and the processing by the subsequent plant parts is determined on the basis of the current process windows of the subsequent plant parts.

According to a variant, the method comprises the step of determining a sequence of products to be produced in the production plant, in particular taking into account the current process window and the achievable quality characteristics of the output products of the plant parts. The production of products in the production plant is optimized on the basis of the current state of the plant parts and the current process windows for a plurality of products to be produced. For example, products with comparable or similar quality requirements are thereby produced one after the other, such that the setting values for the plant automation unit of the plant parts differ as minimally as possible. In particular, the method comprises the step of taking into account differences and/or similarities of the products to be produced when determining the sequence of products to be produced in the production plant.

In accordance with a variant, the method comprises the step of taking into account possible setting value change rates that can be implemented by the respective plant automation units when determining the setting values for the plant automation units of the respective plant parts. Although the plant automation units of the individual plant parts can implement the setting values within the current process window, this is often only possible within specified periods of time. Therefore, no setting value jumps can be implemented, but only changes within a given setting value change rate can be implemented. Such setting value change rates are taken into account by the method when determining the setting values for the plant automation units of the respective plant parts.

A variant of the process comprises the step of checking the achieved product qualities within the scope of a quality control after one or more of the plant parts, in particular for adapting the setting values for the plant automation units of the subsequent plant parts. This checks whether, at the location of quality control, the product produced up to that point has the expected quality characteristics. If the determined quality deviates from the expected quality, the setting values for the plant automation units of the subsequent plant parts may be adapted, such that the product subsequently also meets the quality requirements of the input quality windows and output quality windows of the subsequent plant parts.

In accordance with an expedient variant, the setting values of the plant automation unit of a plant part determine the output quality of the product produced in the plant part, in particular whether and in which range of the output quality window the quality of the product produced in the plant part lies. The quality of the output product of a plant part is thus determined via the setting values, wherein the setting values must lie within the current process window of the plant part.

In an expedient variant, the wear, maintenance state or the like of the system components are detected.

According to a particularly preferred variant, the method comprises the step of creating a prediction model for the future states of the plant parts, wherein the states of the plant parts predicted by the prediction model and the resulting process windows of the plant parts are taken into account when determining the setting values for the plant automation units of the plant parts. By means of the prediction model, the future state of plant parts at the point in time of processing a specified product is predicted in particular. For each plant part, the prediction model specifies the expected states of the plant part at the point in time of respective processing, on the basis of which the process window expected at that point in time is determined. The prediction model improves the accuracy of production plant control, in particular as the number of plant parts increases. The prediction model is particularly advantageous when determining a production sequence for the production plant, since the prediction model can also be used to determine the corresponding states of the plant parts and the resulting process windows for products to be produced in the future, and these can be taken into account when planning the production sequence.

In accordance with a variant, the prediction model is based on the states of the plant parts detected by means of the sensors, the achieved product qualities by the plant parts, other measured values associated with the production plant or the like. In particular, the temporal course of the specified parameters can be monitored and a prediction of future states of the plant parts can be made on the basis of the historical data. The prediction can also be refined by maintenance information, information on products to be produced in the plant or other parameters affecting the production plant.

In an expedient variant, the prediction model is based on methods of statistical data analysis and/or machine learning, in particular linear or quadratic programs, genetic optimization, reinforcement learning with Q-tables, neural networks, simulated annealing, Metropolis, swarm algorithms, hill climbing, the Lagrange multiplier method or the like.

According to an advantageous variant, the prediction model is trained continuously or cyclically, in particular on the basis of the states of the plant parts detected by means of the sensors, the achieved product qualities of the plant parts, other measured values associated with the production plant or the like. The prediction model is thus continuously improved, such that the prediction accuracy increases steadily with the runtime of the production plant.

In accordance with a preferred variant, the method comprises the step of stopping the production process in the production plant if the required quality of the produced product cannot be achieved, or changing the production process to a different product to be produced, the required quality of which can still be achieved by the current production process. Thus, if it is determined that the desired product cannot be produced due to the current plant state, production is either stopped or changed to a different product that can still be produced. This can also take place during the production process, for example, after machining by one or more plant parts.

In an expedient variant, the change to a different product to be produced is limited to the pre-planned production of products to be produced within a specified period of time. Thus, the current production can only be changed to a product to be produced within the near future.

According to a variant, the method comprises the step of taking into account a plurality of plant parts of the same type, such that the processing of a production step can alternatively take place on different plant parts. Thus, if a plant part is unlikely to be able to achieve the required product quality, the production step can be carried out on another plant part of the same type that is likely to be able to provide the required product quality.

In accordance with an expedient variant, the method comprises storing data in a central data storage unit or a cloud storage unit preferably for storing and providing relevant data, in particular the states of the plant parts detected by means of sensors, the achieved product qualities by the respective plant parts, the setting values for the plant automation units of the respective plant parts and the like.

In an advantageous variant, the method comprises the step of detecting geometric information of the products produced in the respective plant part, in particular by means of optical sensors in the respective plant parts. With particular in metallurgical production plants, the geometric information of the products produced in the respective plant part is an essential factor. In particular, the method can derive from the geometric information the product quality of the product produced in the plant part and/or the plant state of the plant part, preferably by means of statistical methods and/or machine learning. Furthermore, the geometric information can be detected continuously by means of the optical sensors in a simple manner and subsequently evaluated, which improves the accuracy of the system.

According to an expedient variant, the method comprises displaying information relevant to the production process on a user interface, in particular on a portable device.

In accordance with a particularly preferred embodiment, the method comprises the step of creating a model for determining the setting values for the plant automation units of the plurality of plant parts. In particular, the model thereby takes into account the input quality windows, the output quality windows and the current process windows of the plurality of plant parts. Furthermore, additional parameters can also be taken into account, such as detected measured values from the plant parts and/or from other data sources such as a production planning system, maintenance planning system or other components of the production plant. On the basis of the input data, the model can determine the optimum setting values for the respective plant parts for producing a product.

According to a variant, the model is based on laws of physics. In an alternative variant, the model is based on methods of statistical data analysis and/or machine learning, in particular linear or quadratic programs, genetic optimization, reinforcement learning with Q-tables, neural networks, simulated annealing, Metropolis, swarm algorithms, hill climbing, the Lagrange multiplier method or the like.

In accordance with an advantageous variant, the method comprises the step of continuously or cyclically training the model to determine the setting values.

The object is further achieved by a computer program comprising instructions that, when the program is executed by a computer, cause the computer to execute the method in accordance with the disclosure, in particular that the system in accordance with the disclosure executes the method in accordance with the disclosure.

BRIEF DESCRIPTION OF THE DRAWINGS

The invention is explained in more detail below with reference to exemplary embodiments shown in the figures. The following are shown.

DETAILED DESCRIPTION

Figure 1:
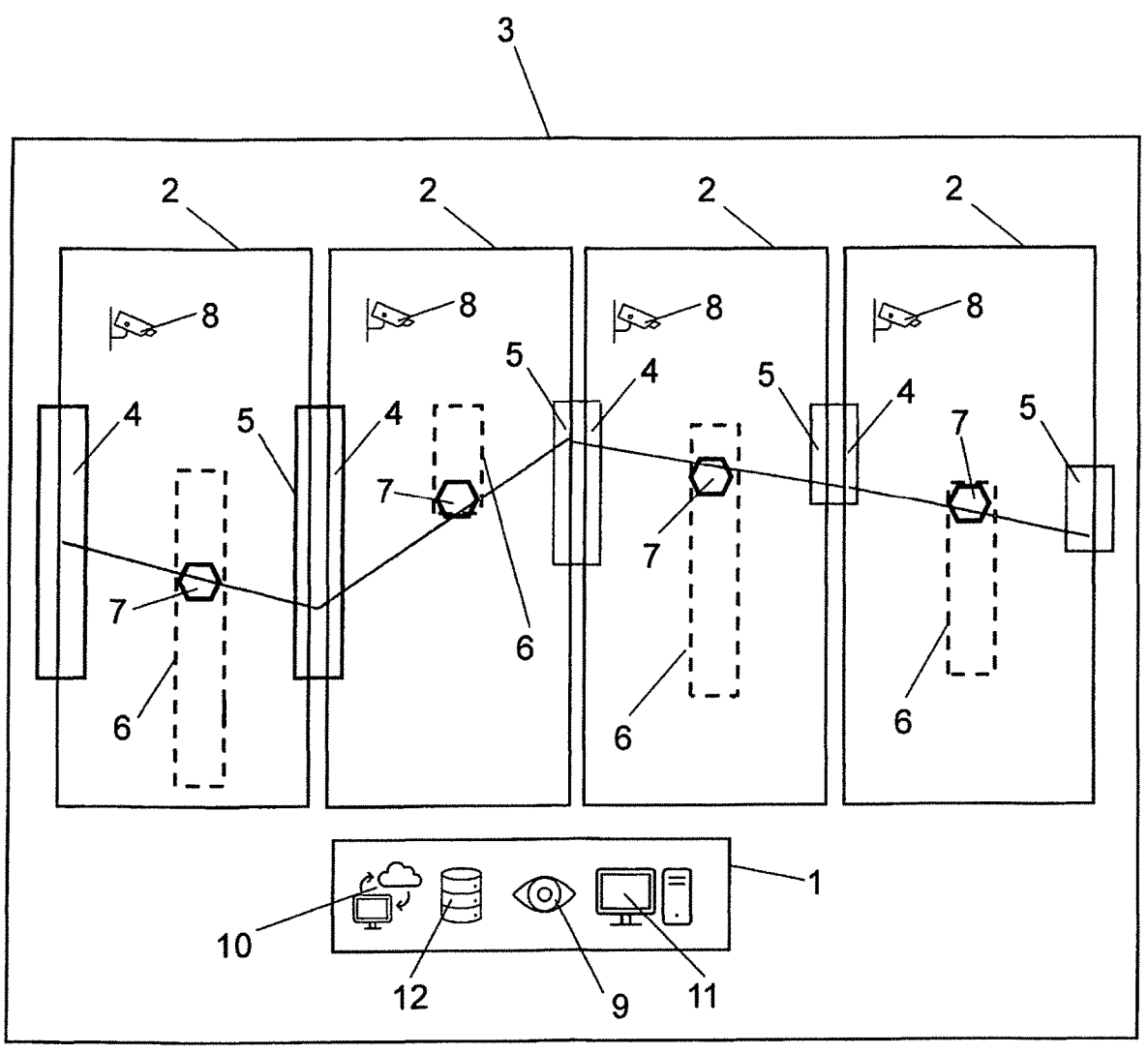
FIG. 1 a schematic view of a first exemplary embodiment of a system for controlling a production plant consisting of a plurality of plant parts, and FIG. 2 a schematic view of a second exemplary embodiment of a system for controlling a production plant consisting of a plurality of plant parts.

FIG. 1 shows a schematic view of a first exemplary embodiment of a system 1 for controlling a production plant 3 consisting of a plurality of plant parts 2, in particular a metallurgical production plant for producing industrial goods such as metal semi-finished products and/or metal end products. Thereby, the system can be arranged inside or outside the production plant 3, wherein the system 1 is designed to communicate with the production plant 3.

Each plant part 2 of the production plant 3 has an input quality window 4, an output quality window 5 and a process window 6. The input quality window 4 of a plant part 2 defines the quality characteristics of the input product that are required by the plant part 2, and the output quality window 5 of a plant part 2 defines the quality characteristics of the output product that are allowed by the plant part 2 after processing the input product. With a production plant 3 consisting of the plurality of plant parts 2, the output quality window 5 of an upstream plant part 2 corresponds to the input quality window 4 of the downstream plant part 2, which is shown in FIG. 1 in each case by a common rectangle covering the two adjacent plant parts 2.

The process window 6 defines the setting values 7 that can be implemented by the respective plant part 2 for a plant automation unit of the plant part 2. The process window 6 is symbolized in FIG. 1 in each case by a dashed rectangle within the plant parts 2. The setting values 7 for the plant automation unit of the plant part 2 lie within the respective process window 6. The setting values 7 are symbolized by hexagons in FIG. 1. The setting values 7 of the plant automation unit of a plant part 2 determine the output quality of the product produced in the plant part 2, in particular whether and in which range of the output quality window 5 the quality of the product produced in the plant part 2 lies. This is symbolized in FIG. 1 in each case by the line from the input quality window 4 through the setting values 7 within the process window 6 to the output quality window 5. A continuous line, which symbolizes the production process within the production plant, thus arises over all plant parts 2 of the production plant 2.

Each plant part 2 detects its current state by means of suitable sensors 8. On the basis of the detected current states of the plant parts 2, the process windows 2 of the plant parts 2 are adapted. For example, the process windows 6 may move and/or change their size in a specified parameter space. This is shown in FIG. 1 by the different dashed rectangles within the plurality of plant parts 2.

The system 1 for controlling the production plant 3 consisting of the plurality of plant parts 2 determines setting values 7 for each plant part 2 for the respective plant automation unit. The setting values 7 determined by the system 1 are within the respective process windows 6 and are selected such that the product produced in the production plant 3 meets the quality characteristics required by the input quality windows 4 and the output quality windows 5 of the plurality of plant parts 2. Since the product produced in the production plant 3 is in the output quality window 5 of the last plant part 2, the quality requirements imposed on the produced product are met.

Preferably, after the product to be produced has been processed by a plant part 2, the system 1 updates the setting values 7 for the plant automation units of the subsequent plant parts 2 on the basis of the achieved output quality of the processed plant part 2 and the current process windows 6 of the subsequent plant parts 2. The setting values 7 for the plant parts 2 still to come are thus continuously adapted, taking into account the processing already carried out by previous plant parts 2.

In an advantageous variant, the system 1 determines a sequence of products to be produced in the production plant 3, in particular taking into account the current process windows 6 and the achievable quality characteristics of the output products of the plant parts 2. The system 1 preferably takes into account the differences and/or similarities of products to be produced when determining the sequence of products to be produced in the production plant 3.

When determining the setting values 7 for the plant automation units of the respective plant parts 2, the system 1 takes into account the possible setting value change rates that can be implemented by the respective plant automation units.

According to a preferred variant, after one or more plant parts 2, the system 1 comprises a quality control, for checking the achieved product qualities, in particular for adapting the setting values 7 for the plant automation units of the subsequent plant parts 2. Thus, at least partially after the plant parts 2, there is a check of whether the produced product is within the output quality window 5. Depending on the determined quality, i.e. the position of the produced product within the output quality window 5, the setting values 7 for the plant automation units of the subsequent plant parts 2 are adapted.

The sensors 8 of the plant parts 2 detect, for example, the wear, the maintenance state or the like of the plant part 2. In particular, the plant parts 2 comprise at least in part optical sensors 8 for detecting geometric information of the products produced in the respective plant part 2. From the geometric information, the system 1 can derive the product quality of the product produced in the plant part 2 and/or the plant state of the plant part 2, preferably by means of statistical methods and/or machine learning.

In accordance with a particularly preferred variant, the system 1 creates a prediction model 9 for the future states of the plant parts 2 and takes into account the states of the plant parts 2 predicted by the prediction model 9 and the resulting process windows 6 of the plant parts 2 when determining the setting values 7 for the plant automation units of the plant parts 2. The prediction model 9 is based, for example, on the states of the plant parts 2 detected by means of the sensors 8, the achieved product qualities of the plant parts 2, other measured values associated with the production plant 3 or the like.

The prediction model 9 is based on methods of statistical data analysis and/or machine learning, in particular linear or quadratic programs, genetic optimization, reinforcement learning with Q-tables, neural networks, simulated annealing, Metropolis, swarm algorithms, hill climbing, the Lagrange multiplier method or the like.

The prediction model 9 is trained, for example, continuously or cyclically, in particular on the basis of the states of the plant parts 2 detected by means of the sensors 8, the achieved product qualities of the plant parts 2, other measured values associated with the production plant 3 or the like.

According to an advantageous variant, the system 1 stops the production process in the production plant 3 if the required quality of the produced product cannot be achieved. If possible, the system 1 can change the production process to a different product to be produced, the required quality of which can still be achieved by the current production process. Expediently, the change to a different product to be produced is limited to the pre-planned production of products to be produced within a specified period of time.

Moreover, the system 1 can take into account a plurality of plant parts 2 of the same type, such that the processing of a production step can alternatively take place on different plant parts 2.

The system 1 from FIG. 1 further comprises a central data storage unit 10 or a cloud storage unit 10, as the case may be, for storing and providing system-relevant data, in particular the states of the plant parts 2 detected by means of sensors 8, the achieved product qualities of the respective plant parts 2, the setting values 7 for the plant automation units of the respective plant parts 2 and the like.

To display information relevant to the production process, the system 1 comprises a user interface 11. The user interface is provided on a portable device, for example, such that the information is also available within the production plant, for example during an inspection.

The system 1 further comprises a model 12 for determining the setting values 7 for the plant automation units of the plurality of plant parts 2. The model 12 is based on laws of physics or on methods of statistical data analysis and/or machine learning, in particular linear or quadratic programs, genetic optimization, reinforcement learning with Q-tables, neural networks, simulated annealing, Metropolis, swarm algorithms, hill climbing, the Lagrange multiplier method or the like. Like the prediction model 9, the model 12 can be trained continuously or cyclically.

Figure 2:
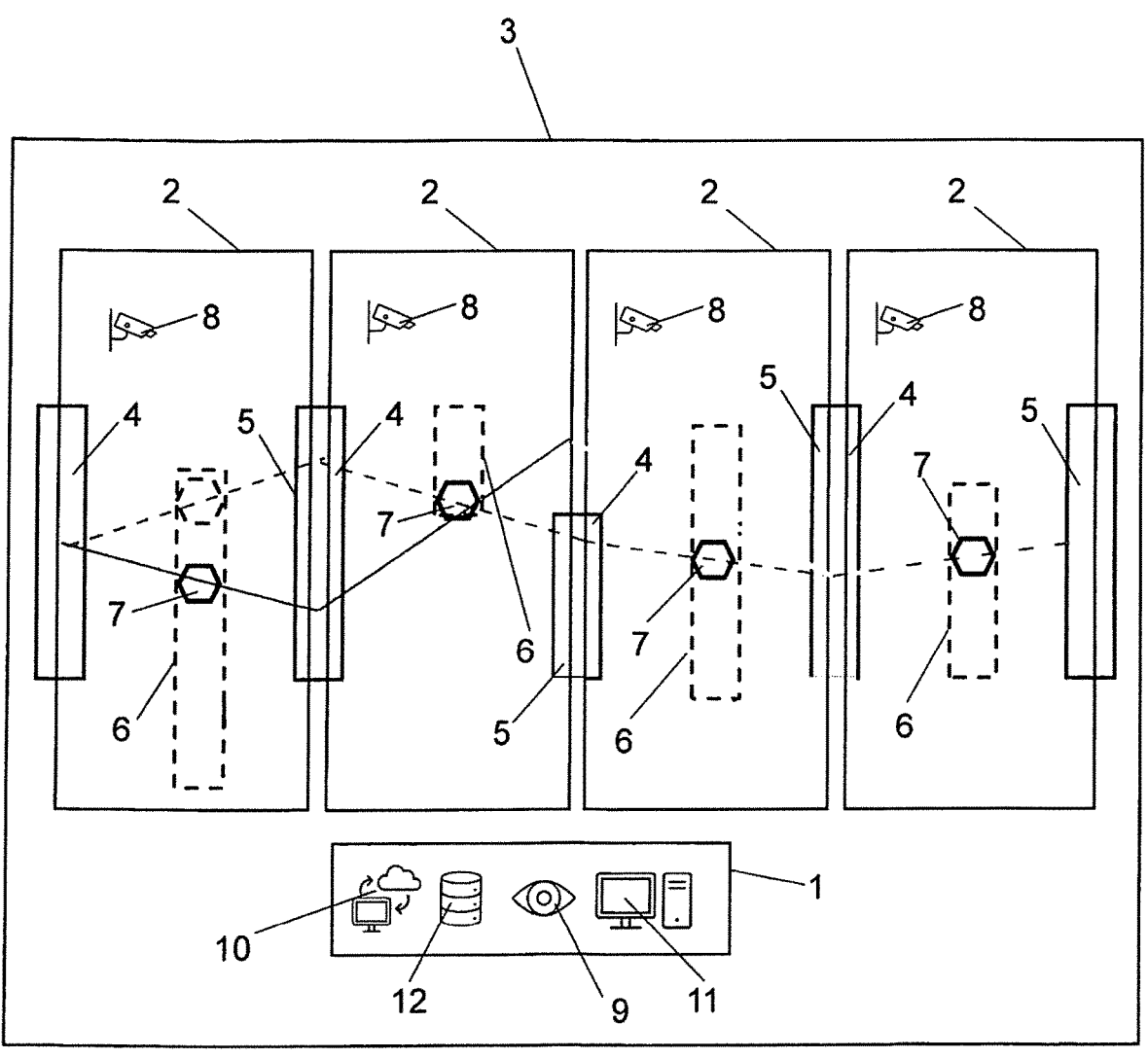

FIG. 2 shows a schematic view of a second exemplary embodiment of a system 1 for controlling a production plant 3 consisting of a plurality of plant parts 2, in particular a metallurgical production plant for producing industrial goods such as metal semi-finished products and/or metal end products, in comparison with a control system according to the prior art.

The invention differs from the prior art by detecting the current states in the plurality of plant parts 2, in particular by means of sensors 8, adapting respective process windows 6 of the plurality of plant parts 2 based on the detected current states of the plurality of plant parts 2, and determining respective setting values 7 for the plant automation units of the plurality of plant parts 2 of the production plant 3, wherein the determined respective setting values 7 are within the adapted respective process windows 6, and wherein the product produced in the production plant 3 meets the quality characteristics required by the input quality windows 4 and output quality windows 5 of the plurality of plant parts 2.

According to the prior art, it is possible that, starting from the processing by a previous plant part 2 and the current process windows 6 of the current plant part 2, the setting values 7 for the plant automation unit of the current plant part cannot be set in such a manner that the produced product is within the output quality window 5 of the current plant part 2. This is symbolized in FIG. 2 by the solid line that, after the second plant part from the left, lies outside the output quality window 5 of the plant part 2.

The current process windows 6 of all plant parts 2 are taken into account when determining the setting values 7 for the plant automation units of the plant parts 2. Thus, the process windows of the plant parts 2 at the end of the production process are already taken into account for the plant parts 2 at the beginning of the production process. The setting values 7 are thus determined in that the product produced in the production plant 3 is within all input quality windows 4 and output quality windows 5 of the plant parts 2. This is shown in FIG. 2 by the dashed line, which lies within all input quality windows 4 and output quality windows 5.

LIST OF REFERENCE SIGNS

1 System
2 Plant part
3 Production plant
4 Input quality window
5 Output quality window
6 Process window
7 Setting values
8 Sensors
9 Prediction model
10 Data storage unit/cloud storage unit
11 User interface
12 Model for predicting setting values

The invention claimed is:

1. A system (1) for controlling a metallurgical production plant (3) having a plurality of plant parts (2) for producing metal semi-finished products and/or metal end products, wherein each plant part (2) has
    an input quality window (4),
    an output quality window (5), and
    a process window (6),
wherein the input quality window (4) of a respective plant part (2) defines quality characteristics of an input product that are required by the respective plant part (2), and
wherein the output quality window (5) of a respective plant part (2) defines permissible quality characteristics of an output product of the respective plant part (2) after processing the input product,
wherein the output quality window (5) of an upstream plant part (2) corresponds to the input quality window (4) of a downstream plant part (2),
wherein the process window (6) defines setting values (7) for a plant automation unit of the respective plant part (2) that can be implemented by the respective plant part (2),
wherein each plant part (2) detects a current state by sensors (8) and adapts the process window (6) of the plant part (2) to the detected current state,
wherein the system (1) for controlling the production plant (3) determines setting values (7) for the respective plant automation unit for each plant part (2) in view of all plant parts (2), such that the setting values are within the process windows (6) and
    such that a product produced in the production plant (3) meets the quality characteristics required by all of the input quality windows (4) and all of the output quality windows (5) of the plurality of plant parts (2),
wherein the system (1) further determines an optimized sequence of a plurality of products to be produced in the production plant (3) by taking into account, for each of the plurality of products, the respective production steps across the plurality of plant parts (2), including the corresponding input quality windows (4), output quality windows (5), and current process windows (6), and
wherein the optimized sequence is determined such that products having comparable or similar quality requirements are produced consecutively, so that differences between setting values (7) for the plant automation units of successive products are minimized.

2. The system (1) according to claim 1, wherein, after the product to be produced has been processed by a plant part (2), the system (1) updates the setting values (7) for the plant automation units of the subsequent plant parts (2) based on an achieved output quality of the processed plant part (2) and current process windows (6) of the subsequent plant parts (2).

3. The system (1) according to claim 1, wherein the system (1) takes into account possible setting value change rates that can be implemented by the respective plant automation units when determining the setting values (7) for the plant automation units of the respective plant parts (2).

4. The system (1) according to claim 1, wherein the system (1) creates a prediction model (9) for future states of the plant parts (2) at respective times at which products of the optimized sequence are to be processed, and
wherein the system (1) takes into account the states of the plant parts (2) predicted by the prediction model (9) and resulting future process windows (6) when determining the optimized sequence of the plurality of products and determining the setting values (7) for the plant automation units of the plant parts (2).

5. The system (1) according to claim 4,
wherein the prediction model (9) is based on one or more of
the current states of the plant parts (2) detected by the sensors (8), achieved product qualities of the plant parts (2), and
other measured values associated with the production plant (3),
and is configured to predict, for each product of the optimized sequence, an expected state of each plant part (2) at a time at which the respective product is processed.

6. The system (1) according to claim 1,
wherein the system (1) takes into account a plurality of plant parts (2) of the same type, such that processing of a production step can alternatively take place on different plant parts (2).

7. The system (1) according to claim 1,
wherein the plant parts (2) comprise optical sensors (8) for detecting geometric information of the products produced in the respective plant part (2).

8. The system (1) according to claim 1,
wherein the setting values (7) for the plant automation units of the plurality of plant parts (2) are determined by a model (12).

9. A method for controlling a metallurgical production plant (3) having a plurality of plant parts (2) for producing metal semi-finished products and/or metal end products,
wherein each plant part (2) has
an input quality window (4),
an output quality window (5), and
a process window (5),
wherein the input quality window (4) of a respective plant part (2) defines quality characteristics of an input product that are required by the respective plant part (2), and
wherein the output quality window (5) of a respective plant part (2) defines permissible quality characteristics of an output product of the respective plant part (2) after processing the input product,
wherein the output quality window (5) of an upstream plant part (2) corresponds to the input quality window (4) of a downstream plant part (2),
wherein the process window (6) defines setting values (7) for a plant automation unit of the respective plant part (2) that can be implemented by the respective plant part (2),
the method comprising:
detecting current states in the plurality of plant parts (2) by sensors (8),
adapting the respective process windows (6) of the plurality of plant parts (2) based on the detected current states of the plurality of plant parts (2),
determining respective setting values (7) for respective plant automation units of the plurality of plant parts (2) in view of all plant parts (2) of the production plant (3),
such that the determined respective setting values (7) are within the adapted respective process windows (6), and
such that a product produced in the production plant (3) meets the quality characteristics required by all of the input quality windows (4) and all of the output quality windows (5) of the plurality of plant parts (2), and determining an optimized sequence of a plurality of products to be produced in the production plant (3), by taking into account, for each of the plurality of products, respective production steps across the plurality of plant parts (2), including corresponding input quality windows (4), output quality windows (5), and current process windows (6),
wherein the optimized sequence is determined such that products having comparable or similar quality requirements are produced consecutively,
thereby minimizing changes in setting values (7) for the plant automation units between successive products.

10. The method according to claim 9,
further comprising updating the setting values (7) for the plant automation units of the subsequent plant parts (2) after the product to be produced has been processed by a plant part (2),
wherein the updating takes place on based on an achieved output quality of the processed plant part (2) and current process windows (6) of the subsequent plant parts (2).

11. The method according to claim 9,
further comprising taking into account possible setting value change rates that can be implemented by the respective plant automation units when determining the setting values (7) for the plant automation units of the respective plant parts (2).

12. The method according to claim 9,
further comprising building a prediction model (9) for predicting future states of the plant parts (2) at respective times at which products of the optimized sequence are to be processed, wherein the states of the plant parts (2) predicted by the prediction model (9) and resulting future process windows (6) of the plant parts (2) are taken in account when determining the optimized sequence of the plurality of products and when determining the setting values (7) for the plant automation units of the plant parts (2).

13. The method according to claim 12,
wherein the prediction model (9) is based on one or more of
the current states of the plant parts (2) detected by the sensors (8),
achieved product qualities of the plant parts (2), and
other measured values associated with the production plant, and
wherein the prediction model (9) is configured to predict, for each product of the optimized sequence, an expected state of each plant part (2) at a time at which the respective product is processed.

14. The method according to claim 9,
further comprising taking into account the plurality of plant parts (2) of the same type, such that the processing of a production step can alternatively take place on different plant parts (2).

15. The method according to claim 9,
further comprising detecting geometric information of the products produced in the respective plant part (2) by optical sensors (8) in the respective plant parts (2).

16. The method according to claim 9,
further comprising creating a model (12) for determining the setting values (7) for the plant automation units of the plurality of plant parts (2).

* * * * *